United States Patent
Klomp

(10) Patent No.: US 8,795,121 B2
(45) Date of Patent: Aug. 5, 2014

(54) DRIVE MECHANISM FOR SELECTIVELY SWITCHING A DRIVE BETWEEN PROPULSION AND TORQUE VECTORING MODE

(75) Inventor: Matthijs Klomp, Ljungskile (SE)

(73) Assignee: GM Global Technology Operations LLC, Detroit, MI (US)

( * ) Notice: Subject to any disclaimer, the term of this patent is extended or adjusted under 35 U.S.C. 154(b) by 202 days.

(21) Appl. No.: 13/143,984

(22) PCT Filed: Jan. 14, 2010

(86) PCT No.: PCT/EP2010/000157
§ 371 (c)(1),
(2), (4) Date: Jul. 11, 2011

(87) PCT Pub. No.: WO2010/081691
PCT Pub. Date: Jul. 22, 2010

(65) Prior Publication Data
US 2011/0269592 A1    Nov. 3, 2011

(30) Foreign Application Priority Data
Jan. 16, 2009 (GB) .................................. 0900652.9

(51) Int. Cl.
*F16D 48/06* (2006.01)
*B60K 1/00* (2006.01)

(52) U.S. Cl.
USPC .......................................... 475/154; 475/151

(58) Field of Classification Search
USPC .......................................... 475/151, 154, 155
See application file for complete search history.

(56) References Cited

U.S. PATENT DOCUMENTS

| | | | |
|---|---|---|---|
| 2,998,538 A * | 8/1961 | O'Mahony ...................... | 310/95 |
| 6,325,736 B1 | 12/2001 | Hamada et al. | |
| 6,849,017 B2 * | 2/2005 | Nett ................................... | 475/5 |
| 7,591,748 B2 * | 9/2009 | Holmes ............................ | 475/5 |
| 8,562,470 B2 * | 10/2013 | Yang ................................. | 475/9 |

FOREIGN PATENT DOCUMENTS

| | | |
|---|---|---|
| DE | 102005040253 B3 | 5/2007 |
| DE | 102006031089 A1 | 1/2008 |
| GB | 2332719 A | 6/1999 |
| JP | 2001039179 A | 2/2001 |
| JP | 2006046495 A | 2/2006 |

OTHER PUBLICATIONS

International Searching Authority, International Search Report for Application No. PCT/EP2010/000157, dated Jun. 7, 2010.
British Patent Office, Search Report for British Application No. 0900652.9, dated May 7, 2009.
British Patent Office, Examination Report for British Application No. 0900652.9, dated Dec. 24, 2012.

* cited by examiner

*Primary Examiner* — David D Le
*Assistant Examiner* — Ryan Dodd
(74) *Attorney, Agent, or Firm* — Ingrassia Fisher & Lorenz, P.C.

(57) ABSTRACT

A hybrid vehicle is provided with a drive mechanism for transmitting torque to at least a first and a second output member as well as to such a drive mechanism. The drive mechanism includes, but is not limited to a torque generating drive member operably coupled to the first and second output members, a switching element operably coupled to the drive member for selectively coupling the drive member with the first and second output members either in a propulsion mode or in a vector mode. In the propulsion mode, the drive member's torque is inducted to first and second output members uni-directionally and in the vector mode, the drive member's torque is inducted to first and second output members in opposite directions.

6 Claims, 2 Drawing Sheets

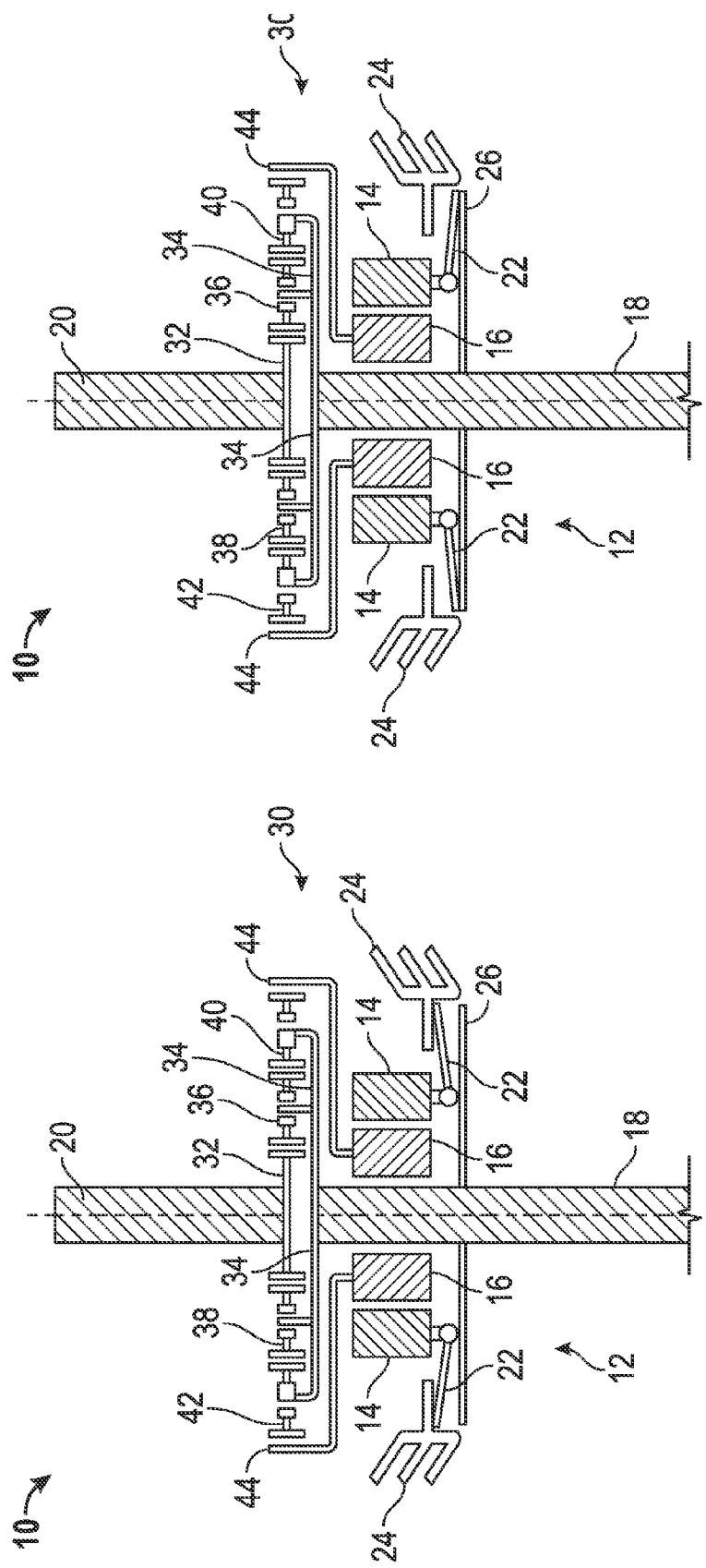

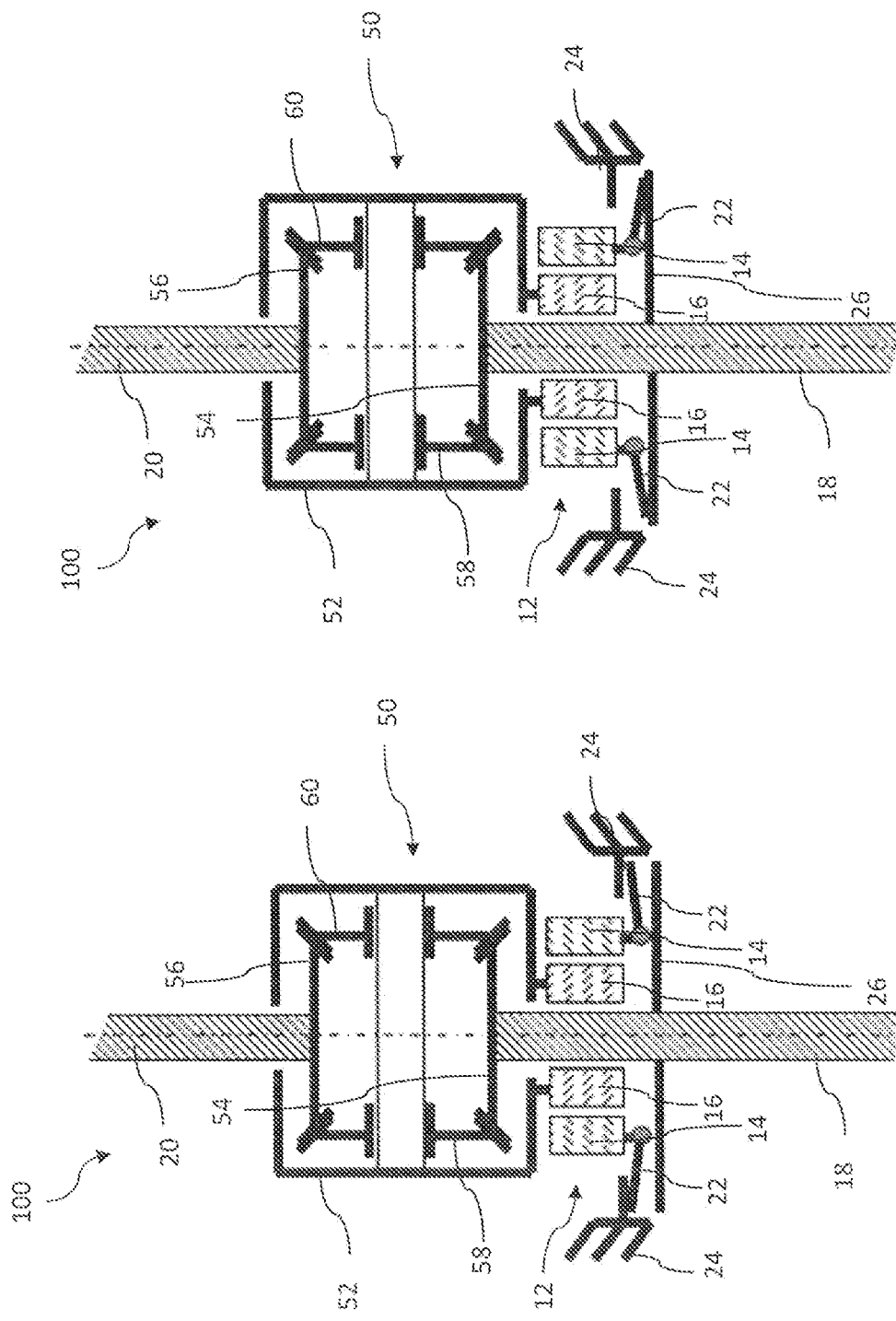

DRIVE MECHANISM FOR SELECTIVELY SWITCHING A DRIVE BETWEEN PROPULSION AND TORQUE VECTORING MODE

CROSS-REFERENCE TO RELATED APPLICATIONS

This application is a U.S. National-Stage entry under 35 U.S.C. §371 based on International Application No. PCT/EP2010/000157, filed Jan. 14, 2010, which was published under PCT Article 21(2) and which claims priority to British Application No. 0900652.9, filed Jan. 16, 2009, which are all hereby incorporated in their entirety by reference.

TECHNICAL FIELD

The technical field relates to drive mechanisms for transmitting torque to at least a first and a second output member, in particular to various wheel axles of a motorized vehicle. Furthermore, the invention relates to motorized vehicles, in particular hybrid vehicles that comprise an engine and an electric drive member.

BACKGROUND

In modern drive systems, such as power trains for motorized vehicles, torque vectoring and active-yaw-systems becomes more and more prominent. With active-yaw-systems or torque-vectoring systems, torque is selectively unevenly distributed to the left and right wheel of a vehicle axle. In order to manipulate angular yaw acceleration of the vehicle, electronically controlled active-yaw or torque-vectoring systems therefore provide a kind of steering effect that may provide improved vehicle agility and stability.

In effect, active-yaw systems or torque-vectoring systems improve the vehicle's stability against understeering or oversteering. Hence, an arising yaw momentum can be counterbalanced by precisely dosed longitudinal forces on front and rear axle. In this way, a fully adjustable optimized lateral driving dynamics can be achieved. Active-yaw systems can further improve the turn-in response speed and damping as result of the driver's steering inputs, resulting in a more responsive and easier handled vehicle.

Generally, active-yaw-systems and torque-vectoring systems make use of branching off a certain amount of torque from a propulsion drive mechanism. Available systems are changing the torque bias between the left and right wheels of an axle. These mechanisms slow down the inner wheel and the outer wheel is speeded up. This means that, regardless of the input torque, there will be a torque difference proportional to the speed difference imposed between the wheels. Typical existing solutions include transmission gears between a left and a right wheel of an axle, wherein respective drive shafts of the transmission gears are to be coupled with the propulsion drive or with respective wheels by means of numerous clutches.

A limitation of systems with fixed speed difference ratio operated via a slipping clutch is that the biasing depends on the cornering radius and the amount of clutch locking. Of course, slipping of the clutch will result in clutch wear and energy losses which limit the duration and amount of engagements. Also, the speed difference transmissions have drag losses even when not used. Finally, if the free-rolling speed difference due to a tight cornering radius is equal or larger than the speed ratio of the gearing, then no vectoring is possible.

Almost any active-yaw-system or torque-vectoring-system makes use of such a torque branching off, wherein the torque between the two outputs of the differential is biased.

Such a solution is for example illustrated in DE 10 2005 040 253 B3. It is characterized by two clutches, whose outer parts are axially tensed by means of a bridging element.

Such active-yaw or torque-vectoring systems are generally quite elaborate in construction and cost-intensive in production.

Recent developments suggest the implementation of an additional, auxiliary electric motor for providing an offset torque to be superimposed to the various wheel axles that are subject to active-yaw or torque-vectoring. Since active-yaw or torque-vectoring in typical applications is only applied occasionally, the auxiliary motor is idle during residual time intervals during which the auxiliary motor is not required.

It is therefore at least one object to provide a drive mechanism for transmitting torque to at least a first and a second output member, wherein a drive member, such as an auxiliary motor can be used in a more efficient and universal way. Moreover, it is at least a further object, to provide a torque transmitting and distributing drive mechanism, that comprises a simple internal structure, allowing for an easy and cost-efficient manufacturing.

SUMMARY OF THE INVENTION

A drive mechanism is provided for transmitting torque to at least a first and a second output member. The drive mechanism comprises a torque generating drive member that is operably coupled to first and second output members. Further, the drive mechanism comprises a switching element that is operably coupled to the drive member for a selective coupling of the drive member with the first and second output members.

By means of the switching element, the coupling between the drive member to first and second output members can be of a propulsion mode or of a vector mode. Hence, by means of the switching element, the torque generating drive member can be coupled to first and second output members in two modes, in which the torque provided by the drive member is differently transferred to first and second output members.

In the propulsion mode, the coupling between drive member and first and second output member is such, that the torque provided or generated by the drive member is inducted uni-directionally to first and second output members. Hence, the generated torque transfers to both output members in a common sense of rotation. In a vehicle implementation, wherein first and second output members correspond to left and right wheel axles of a vehicle, both wheels rotate in the same direction. Such a torque can be therefore used to drive the vehicle straight on.

In the other switching mode, denoted as vector mode, the drive member's torque is inducted to first and second output members in opposite directions. For instance, the torque generated by the drive member is transferred to the first output member in a positive sense, whereas the second output member receives a respective negative torque or negative torque offset.

Speaking in terms of a vehicle implementation, a right or outer wheel as first output member may rotate faster and a left or inner wheel as second output member may rotate slower as an effect of an opposite, preferably diametrically opposite, torque transfer to first and second output members. Consequently, in the vector mode, the drive member is predominately used for torque-vectoring or for the purpose of an active-yaw system. In this mode, the drive member serves to improve the vehicle's turning agility and stability against understeering or oversteering.

By means of the switching element, the drive member can universally be applied for propulsion as well as for torque-vectoring purposes for a motorized vehicle. This way, with the switching element in propulsion mode, the drive member sustains the general propulsion for driving of the vehicle. Contrary, in vector mode, the drive member is coupled to first and second output members in such a way, that an offset torque generated by the drive member is superimposed to first and second output members in opposite directions, hence in a counter-directional way.

According to a first embodiment, the drive member comprises first and second drive elements that are rotatably supported with respect to each other. Hence, the first and/or the second drive element is rotatably supported or rotatably mounted, thus allowing for a rotational movement of first and second drive elements relative to each other. For instance, the first or the second drive element may be fixed and immobilized, while the second or first drive element may rotate relative to the first or second drive element. A relative movement, hence a rotational motion of e.g. the first drive element relative to the second drive element and vice versa can be induced for instance by electromechanical forces to be generated by and acting upon first and second drive elements.

In a further embodiment, the drive member is designed as an electric motor with the first and second drive elements as rotor and stator. Preferably, the first drive element is implemented as rotor and the second drive element is implemented as stator. By providing respective electrical energy, the two drive elements will start to rotate with respect to each other. In certain implementations, in particular when the switching element is in propulsion mode, the stator, as first drive element might be fixed or immobile, whereas in vector mode both, stator as well as rotator might be rotatably supported and may rotate around a common axis in opposite direction.

In a further preferred embodiment, the switching element is connected, preferably rigidly connected to the first drive element.

Furthermore, the switching element is selectively coupleable to the first output member or to a fixed base member. Depending on whether the switching element is coupled or connected to the first output member or to the fixed and immobile base member, a respective switching mode, namely vector mode or propulsion mode is selected. Typically, when coupled or connected to the first output member, the switching element is in vector mode. If coupled or connected to a base member, e.g., a component of the vehicle chassis or vehicle body, the switching element will be in propulsion mode.

Due to the connection of switching element and first drive element of the drive member, the switching functionality may be entirely embedded into a drive member itself. Preferably, the switching functionality comprises a selective coupling of an electromotor's stator either to a fixed base member or to the first output member.

Further, according to another embodiment, the second drive element is operably coupled to the second output member. In this way, depending on the configuration and selected mode of the switching element, the torque generated by the drive member can either be uni-directionally transferred to first and second output members or it can be transferred to first and second output members in opposite directions, hence counter-directionally.

In embodiments, wherein the switching element is coupled or connected to the first drive element, also the first drive element is selectively coupleable to the first output member or to the fixed base member by means of the switching element. In this way, the switching element provides a selective locking of the first drive element.

In another further embodiment, the releasable coupling between switching element and first output member is provided by a coupling element being rotatably connected to the first output member. Preferably, the coupling element is directly and rigidly connected to the first output member, e.g., a drive shaft of a vehicle wheel. In typical embodiments, the coupling element extends radially to the rotatable first output member. Preferably, the coupling element comprises a flange-like structure.

It may further frictionally or positively engage with the switching element, which is in turn adapted to transfer torque between the first drive element and the first output member via the coupling element. The releasable coupling or connection of the switching element and coupling element may comprise a clutch-like mechanism allowing to engage and to disengage switching element and coupling element even if said components rotate at different angular velocities.

According to another embodiment, the first and second output members as well as the drive member are operably coupled to a differential gear. By means of a differential, an additional torque can be transferred to first and second output members. Moreover, by means of the differential gear, first and second output members are mechanically coupled. In preferable embodiments, the drive member is directly coupled to the first output member and is further coupled to the second output member via the differential gear.

In a further embodiment, the differential gear is designed as a planetary gear differential comprising an outer ring gear that is operably coupled with the second drive element.

In typical implementations, the second drive element is not directly connected or coupled to the outer ring gear of the planetary gear differential. In order to provide sufficient torque, the second drive element and the outer ring gear may be mechanically coupled by means of a transmission gearing. Furthermore, also, the coupling between the coupling element and the first output member may comprise a transmission gearing.

Additionally, the first output member is operably coupled to a carrier of the planetary gear differential and the second output member is operably coupled to a sun gear of the planetary gear differential. Preferably, the first output member is directly connected to the carrier of the planetary gear differential and/or the second output member is directly connected to the sun gear of the planetary gear differential.

The carrier of the planetary gear differential rotatably supports numerous planetary gears that mesh with the ring gear and with the sun gear of the planetary gear differential.

It is further of advantage, when the planetary carrier supports at least two or even more sets of adjacently arranged pairs of planetary gears, wherein an inner planetary gear meshes with the sun gear and further meshes with an outer planetary gear. The outer planetary gear in turn meshes with the inner planetary gear and with the ring gear of the planetary gear differential. In this way, equal sense of rotation of sun gear and outer ring gear is provided.

According to an alternative embodiment, the differential gear is designed as a bevel gear differential comprising a carrier that is operably coupled to the second drive element.

Additionally, first and second output members of the drive mechanism are operably coupled to oppositely disposed side gears of the bevel gear differential. The bevel gear differential further comprises at least one, preferably two pinions rotatably supported on pinion shafts that are rigidly connected to the differential carrier.

A hybrid vehicle is also provided that comprises an engine and an electric drive member. The electric drive member is selectively coupleable to first and second drive shafts of a driven vehicle axle, wherein the hybrid vehicle is characterized by a drive mechanism as described above. In typical embodiments, first and second output members of the torque distributing drive mechanism are designed as half shafts of a vehicle's driven axle, wherein the input differential is connected to e.g. a combustion engine-driven power train.

In this way, first and second output members are coupled and connected to left and right wheels of a vehicle's front and/or rear axle.

In further additional or alternative embodiments, it is also conceivable to connect first and second output members to the front and rear axle of a vehicle, in order to selectively provide uneven torque distribution to a vehicle's front and rear axle.

BRIEF DESCRIPTION OF THE DRAWINGS

The present invention will hereinafter be described in conjunction with the following drawing figures, wherein like numerals denote like elements, and:

FIG. 1 schematically depicts in cross-sectional illustration a first embodiment of the drive mechanism with the switching element in propulsion mode;

FIG. 2 shows the embodiment according to FIG. 1 with the switching element in vector mode;

FIG. 3 illustrates a cross-sectional sketch of another embodiment with the switching element in propulsion mode; and FIG. 4 shows the embodiment according to FIG. 3 with the switching element in vector mode.

DETAILED DESCRIPTION

The following detailed description is merely exemplary in nature and is not intended to limit application and uses. Furthermore, there is no intention to be bound by any theory presented in the preceding background or summary or the following detailed description.

Referring to the embodiment according to FIG. 1 and FIG. 2, the drive mechanism 10 comprises an electric motor 12 that has a stator 14 denoted as first drive element and a rotor 16 denoted as second drive element. The drive mechanism 10 further comprises a planetary gear differential 30 having a sun gear 32 and a carrier 34 with rotatably supported planetary gears 36, 38, 40, 42. The planetary gear differential 30 further has an outer ring gear 44 that meshes with radially outer planetary gears 40, 42. These outer planetary gears 40, 42 mesh with inner planetary gears 36, 38, which in turn are engaged with the sun gear 32.

Further, a first output member 18 is directly coupled or connected to the planetary carrier 34 and a second output member 20 is directly coupled or connected to the sun gear 32 of the planetary gear differential 30.

The stator 14 of the electric motor 12 in the configuration of FIG. 1 is mechanically engaged or coupled to a base member 24 by means of the switching element 22. The base member 24 is rotatably fixed. The base member 24 is for instance rigidly connected or coupled to the chassis or body of a vehicle.

By means of the switching element 22, the stator 14 of the electric motor 12 can be selectively rotatably locked. Such a locked configuration, which corresponds to the propulsion mode, is illustrated in FIG. 1. The vector mode, in which the switching element is disconnected from the base member 24 and wherein the switching element 22 is engaged with a coupling element 26, is depicted in FIG. 2.

The coupling element 26, schematically illustrated as a horizontal, substantially straight line radially extends from the first output member 18. The coupling member 26 may frictionally or positively engage with the switching element 22 in order to transfer between the latter and the first output member 18, when the stator 14 sets in rotational movement. The engagement of the coupling element 26 and the switching element 22 may resemble a clutch-like coupling, thus allowing to engage and to disengage switching element 22 and coupling element 26 even if these two components rotate at different angular velocities.

In propulsion mode, as depicted in FIG. 1, an activation of the electric motor 12 leads to a rotative movement of the rotor 16. This rotation transfers to the ring gear 44 of the planetary gear differential 30. Typically, the mechanical coupling of rotor 16 and ring gear 44 further comprises a transmission gearing to supply sufficient torque to the ring gear 44. Since the planetary carrier 34 rotatably supports radially adjacently mounted sets of planetary gears 36, 40 and 38, 42, a rotative movement of the ring gear 44 transfers to a rotative movement of first and second output members 18, 20, wherein the sense of rotation of first and second output members 18, 20 is identical.

Hence, by activation of the electric motor 12 and with the switching element in propulsion mode, the torque generated by the drive 12 is transferred uni-directionally to both, first and second output members 18, 20.

In the vector mode, as depicted in FIG. 2, the stator 14 is rotatably coupled to the first output member 18. Now, both drive elements, stator 14 as well as rotor 16 are free to rotate and since rotor 16 and stator 14 conduct a relative rotational movement with respect to each other, the first and second output members 18, 20 will also rotate in different directions. Hence, the torque to be generated by the drive member 12 is transferred oppositely to first and second output members.

It is further conceivable that the differential gear 30 serves as an input gear in order to drive first and second output members 18, 20. In such embodiments, activation of the drive member 12 in vector mode may for instance lead to an increasing torque at the first output member 18 and to a decreasing torque at the second output member 20, or vice versa, depending on the relative rotational movement of stator 14 and rotor 16.

The torque generated by the drive member 12 can thus be regarded as an offset torque to be superimposed either in a positive or negative sense to the torque provided and distributed by the planetary gear differential 30.

In comparison to the embodiment of FIG. 1 and FIG. 2, in the embodiment of FIG. 3 and FIG. 4, the planetary gear differential has been replaced by a bevel gear differential 50. Here, the rotor 16 is connected and coupled to a differential carrier 52. The first output member 18 is directly coupled to a side gear 54 and the second output member is directly coupled to an oppositely located side gear 56.

Both side gears are coupled to each other by means of pinions 58, 60 supported on pinion shafts that are connected to the differential carrier 52. The functionality of this drive mechanism 100 making use of a bevel gear differential 50 is directly comparable to the embodiment according to FIG. 1 and FIG. 2. In the propulsion or locked mode according to FIG. 3, activation of the electric motor 12 leads to a respective rotation of the differential carrier 52. This in turn transfers to a corresponding unidirectional rotational motion of first and second output members 18, 20.

In this propulsion mode as illustrated in FIG. 3, a torque provided by the drive member 12 is thus uni-directionally transferred to first and second output members 18, 20.

In the vector mode, as depicted in FIG. 4, the stator 14 as first drive element is decoupled from the base member 24 and rotatably coupled to the output member 18 by means of the coupling element 26. In this configuration, an activation of the electric motor 12 leads to a counter-directional transfer torque to first and second output members 18, 20.

Also in this embodiment, the bevel gear differential 50 may serve as input differential in order to provide both, first and second output members 18, 20 with equal torque, which may be generated by a not particularly illustrated additional engine, like a combustion engine in a hybrid vehicle.

Finally, the drive mechanism as illustrated in FIG. 1 to FIG. 4 is designated and intended for implementation into a hybrid vehicle comprising at least a first engine, of e.g. combustion type and a second engine, as for instance an electric motor. By means of the drive mechanisms 10, 100, the torque provided by the electric motor 12 can be selectively used for general propulsion purposes or for torque vectoring or active-yaw purposes.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A drive mechanism for transmitting torque to at least a first output member and a second output member, comprising:
    a torque generating drive member operably coupled to the first output member and the second output member, the torque generating drive member including a first drive element and a second drive element rotatably supported with respect to the first drive element; and
    a switching element connected to the first drive element and configured to selectively transfer torque generated by the torque generating drive member to the first output member and second output member either in a propulsion mode or in a vector mode, the switching element movable between engagement with a fixed base member in propulsion mode and engagement with a coupling element in vector mode;
    the coupling element coupled to the first output member and extending radially outward from the first output member,
    wherein in the propulsion mode, torque of the torque generating drive member is inducted to first output member and second output member uni-directionally; and
    wherein in the vector mode, the torque of the drive member is inducted to first output member in an opposite direction to the second output member,
    wherein the first output member, the second output member and the drive member are operably coupled to a planetary gear differential comprising an outer ring gear operably coupled with the second drive element and the first output member is operably coupled to a carrier of the planetary gear differential, and
    wherein the second output member is operably coupled to a sun gear of the planetary gear differential.

2. The drive mechanism according to claim 1, wherein the drive member is an electric motor with the first drive element as a stator and the second drive element is a rotor.

3. The drive mechanism according to claim 1, wherein the second drive element is operably coupled to the second output member.

4. A hybrid vehicle comprising:
    an engine;
    an electric drive member selectively coupleable to a first drive shaft and a second drive shaft of a vehicle axle driven by the engine with a drive mechanism, the drive mechanism comprising:
        a torque generating drive member operably coupled to the first drive shaft and the second drive shaft, the torque generating drive member including a first drive element and a second drive element rotatably supported with respect to the first drive element; and
        a switching element connected to the first drive element and configured to selectively transfer torque generated by the torque generating drive member to the first drive shaft and second drive shaft in either a propulsion mode or a vector mode, the switching element movable between engagement with a fixed base member in propulsion mode and engagement with a coupling element in vector mode;
        the coupling element coupled to the first drive shaft and extending radially outward from the first drive shaft,
        wherein in the propulsion mode, torque of the torque generating drive member is inducted to first drive shaft and second drive shaft uni-directionally, and
        wherein in the vector mode, the torque of the drive member is inducted to first drive shaft in an opposite direction to the second drive shaft,
        wherein the first drive shaft, the second drive shaft and the drive member are operably coupled to a planetary gear differential comprising an outer ring gear operably coupled with the second drive element and the first drive shaft is operably coupled to a carrier of the planetary gear differential, and
        wherein the second drive shaft is operably coupled to a sun gear of the planetary gear differential.

5. The hybrid vehicle according to claim 4, wherein the drive member is an electric motor with the first drive element as a stator and the second drive element as rotor.

6. The hybrid vehicle according to claim 4, wherein the second drive element is operably coupled to the second drive shaft.

* * * * *